United States Patent [19]

Shieh et al.

[11] Patent Number: 5,288,788
[45] Date of Patent: Feb. 22, 1994

[54] CARBON BLACKS IMPARTING SUPERIOR TREADWEAR/HYSTERESIS PERFORMANCE AND PROCESS FOR PRODUCING CARBON BLACKS

[75] Inventors: Chiun Huei Shieh, Lexington, Mass.; John M. Branan, Jr., Amarillo, Tex.; Ted W. Bush, Carlisle, Mass.; William L. Sifleet, Acton, Mass.; Miles Mace, Dover, Mass.

[73] Assignee: Cabot Corporation, Boston, Mass.

[21] Appl. No.: 861,978

[22] PCT Filed: Jan. 8, 1991

[86] PCT No.: PCT/US91/00065

§ 371 Date: Jun. 24, 1992

§ 102(e) Date: Jun. 24, 1992

Related U.S. Application Data

[63] Continuation-in-part of Ser. No. 462,163, Jan. 8, 1990, abandoned.

[51] Int. Cl.⁵ .................................................. C09C 1/50
[52] U.S. Cl. ................................... 524/495; 423/449.1
[58] Field of Search ................... 423/449.1; 524/496, 524/495

[56] References Cited

U.S. PATENT DOCUMENTS 4,540,560 9/1985 Henderson et al. ............... 423/450
4,908,401 3/1990 Ohara et al. ....................... 524/495

*Primary Examiner*—Wayne Langel
*Assistant Examiner*—Stuart L. Hendrickson
*Attorney, Agent, or Firm*—Lawrence A. Chaletsky; Harry J. Gwinnell

[57] ABSTRACT

Carbon blacks having a $CTAB \geq (I_2 \text{ No.} + 5 \text{ m}^2/\text{g})$; a $CDBP \geq 104 \text{ cc}/100 \text{ g}$; a Tint of $(0.5(CTAB) + 70 \text{ m}^2/\text{g} > \text{Tint} > 0.5(CTAB) + 60 \text{ m}^2/\text{g})$ and an ASTM aggregate volume $\geq 480,000 \text{ (nm)}^3$. Also disclosed are rubber compositions in which the carbon blacks are incorporated.

10 Claims, 3 Drawing Sheets

CARBON BLACKS IMPARTING SUPERIOR TREADWEAR/HYSTERESIS PERFORMANCE AND PROCESS FOR PRODUCING CARBON BLACKS

This application is a continuation-in-part of U.S. patent application Ser. No. 07/462,163, filed Jan. 8, 1990, now abandoned.

FIELD OF THE INVENTION

The present invention relates to a new class of new and novel furnace carbon blacks which are suitable for various applications and particularly well suited for use in rubber compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions. Most importantly, carbon blacks are effective in the preparation of rubber vulcanizates intended for usage in preparing tires.

It is generally desirable in the production of tires to utilize carbon blacks which produce tires with satisfactory abrasion resistance and hysteresis performance. The treadwear properties of a tire are related to abrasion resistance. The greater the abrasion resistance of a tire, the greater the number of miles the tire will last before wearing out. The hysteresis of a rubber compound means the difference between the energy applied to deform a rubber compound, and the energy released as the rubber compound recovers to its initial undeformed state. Tires with lower hysteresis values have reduced rolling resistance and therefore are able to reduce the fuel consumption of the vehicle utilizing the tire. Thus it is particularly desirable to produce carbon blacks capable of imparting greater abrasion resistance and lower hysteresis to tires.

Accordingly, one object of the present invention is the production of new carbon blacks which impart improved treadwear and hysteresis performance properties to natural rubbers, synthetic rubbers and blends of natural and synthetic rubbers incorporating the carbon blacks.

Another object of the present invention is new rubber compositions, advantageous for use as high performance tires, and particularly advantageous for use as passenger car tires, incorporating the new carbon blacks.

Other objects of the present invention will become apparent from the following description and the claims.

SUMMARY OF THE INVENTION

We have discovered a new class of carbon blacks having a CTAB of at least the iodine adsorption number ($I_2$ No.) plus 5 m²/g (CTAB $\geq$ $I_2$ No. +5 m²/g), which CTAB is between at least 80 m²/g and not greater than 105 m²/g (105 m²/g $\geq$ CTAB $\geq$ 80 m²/g), a CDBP (crushed dibutyl phthlate number) of at least 104 cc/100 g (cubic centimeters per 100 grams) (CDBP $\geq$ 104 cc/100 g), a tint value, in %, of between about one-half CTAB plus 60, and about one-half CTAB plus 70 (0.5(CTAB)+70 $\geq$ Tint $\geq$ 0.5(CTAB)+60) and an ASTM aggregate volume of at least 480,000 (nm)³ (ASTM aggregate volume $\geq$ 480,000 (nm)³). Preferably the carbon blacks have a CDBP of between at least 104 cc/100 g and not greater than 120 cc/100 g (120 cc/100 g $\geq$ CDBP $\geq$ 104 cc/100 g) and/or an ASTM aggregate volume of between at least 500,000 (nm)³ and not greater than 600,000 (nm)³ (600,000 (nm)³ $\geq$ ASTM aggregate volume $\geq$ 500,000 (nm)³. We have also discovered a new aggregate volume $\geq$ 500,000 (nm)³. We have also discovered a new class of rubber compositions containing these carbon blacks.

The carbon blacks of the present invention may be produced according to the process we have discovered or by a conventional process in a furnace carbon black reactor having a first (combustion) zone, a feedstock injection zone, and a reaction zone. The carbon blacks of the present invention described in Examples 3 and 4, herein, were produced in a furnace carbon black reactor having a stepped reaction zone, wherein the diameter of the portion of the reaction zone nearest the feedstock injection zone is smaller than the diameter of a portion of the reaction zone further downstream of the feedstock injection zone. The carbon blacks of the present invention described in Examples 1 and 2, herein, were produced in a furnace carbon black reactor without a stepped reaction zone.

In the feedstock injection zone, a carbon black yielding feedstock is injected in any manner known to the art, into a hot combustion gas stream. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid. The process for preparing the novel carbon blacks of the present invention will be described in greater detail hereinafter.

The rubbers for which the novel carbon blacks of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjegated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide: also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon blacks of the present invention is that the carbon blacks impart greater abrasion resistance and lower hysteresis to compositions containing natural rubbers, synthetic rubbers or blends thereof in which the carbon blacks of the present invention are incorporated.

An advantage of the rubber compositions of the present invention is the that the rubber compositions are particularly well suited for use as passenger car tires with improved treadwear and fuel economy characteristics.

A further advantage of the rubber compositions of the present invention is that the rubber compositions, with increased carbon black loading, are well suited for use as high performance tires with improved characteristics.

Other advantages of the present invention will become apparent from the following more detailed description of the invention.

DETAILED DESCRIPTION OF THE INVENTION

The carbon blacks of the present invention are characterized by having a CTAB of at least the iodine adsorption number ($I_2$ No.) plus 5 (CTAB≧$I_2$ No.+5, m²/g), which CTAB is between at least 80 m²/g and not greater than 105 m²/g (105 m²/g≧CTAB≧80 m²/g), a CDBP (crushed dibutyl phthlate number) of at least 104 cc/100 g (cubic centimeters per 100 grams) (CDBP≧104 cc/100 g), preferably between at least 104 cc/100 g and not greater than 120 cc/100 g (120 cc/100 g≧CDBP≧104 cc/100 g); a tint value, in %, of between about one-half CTAB plus 60, and about one-half CTAB plus 70 (0.5(CTAB)+70≧Tint≧0.5(-CTAB)+60); and an ASTM aggregate volume of at least 480,000 (nm)³ (ASTM aggregate volume≧480,000 (nm)³), preferably between at least 500,000 (nm)³ and not greater than 600,000 (nm)³ (600,000 (nm)³≧ASTM aggregate volume≧500,000 (nm)³.

Figure 1:
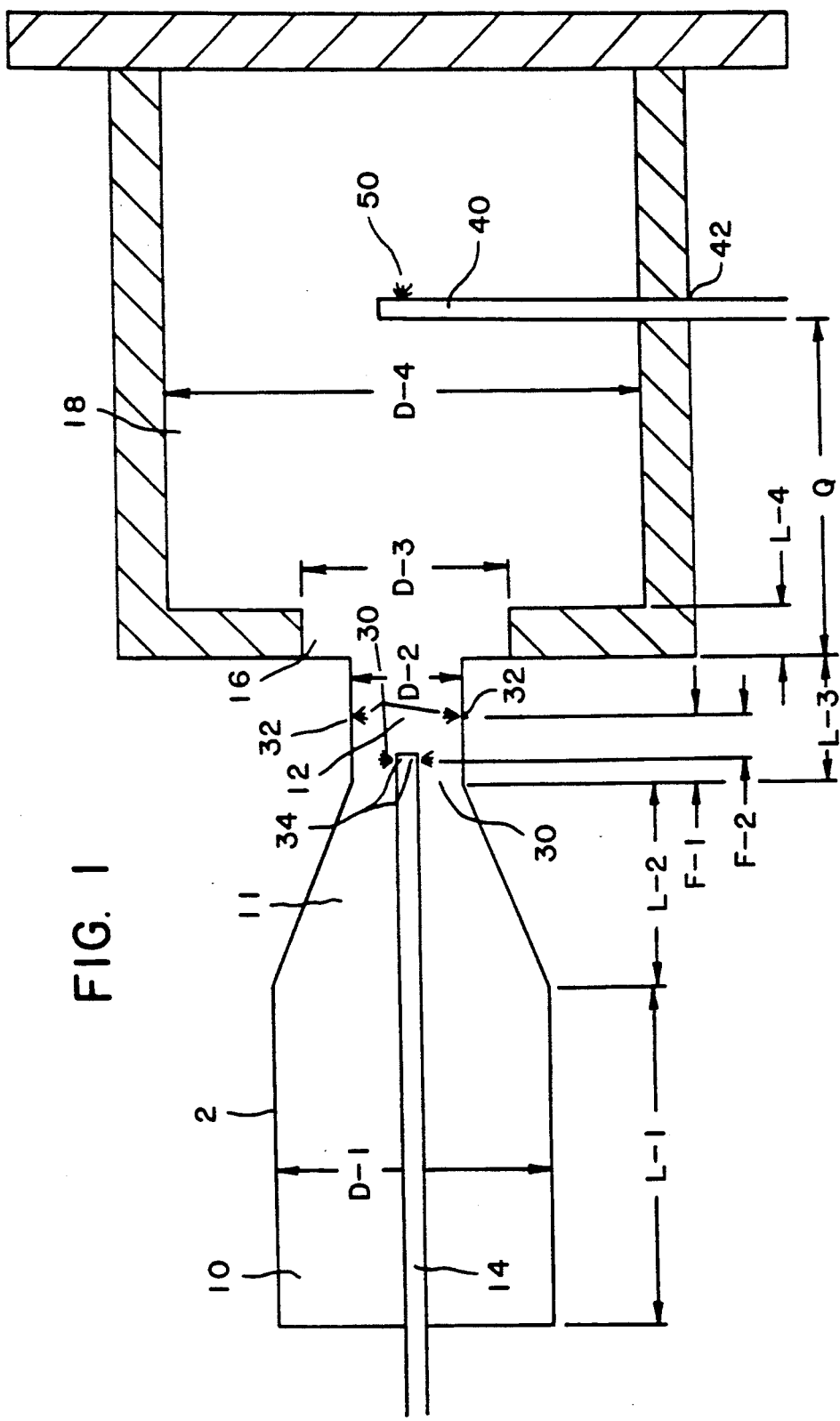
FIG. 1 is a cross-sectional view of a portion of one type of furnace carbon black reactor which may be utilized in the process of the present invention and to produce the carbon blacks of the present invention.

The carbon blacks of the present invention may be produced in a modular, also referred to as "staged", furnace carbon black reactor. A section of a typical modular furnace carbon black reactor which may be utilized to produce the carbon blacks of the present invention is depicted in FIG. 1 illustrating a furnace carbon black reactor 2, having a combustion zone 10, which has a zone of converging diameter 11; feedstock injection zone 12; and reaction zone 18 which has a zone of restricted diameter 16. The diameter of the combustion zone, 10, up to the point where the zone of converging diameter, 11, begins is shown as D-1; the diameter of zone 12, as D-2; the diameter of the zone, 16, as D-3; the diameter of zone 18 as D-4. The length of the combustion zone, 10, up to the point where the zone of converging diameter, 11, begins is shown as L-1; the length of the zone of converging diameter is shown as L-2; the length of the feedstock injection zone is shown as L-3; the length of zone, 16, is shown as L-4.

To produce the carbon blacks of the present invention hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone, 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to fuel varies with the type of fuel utilized. When natural gas is utilized to produce the carbon blacks of the present invention, the ratio of air to fuel may be from about 10:1 to about 20:1. To facilitate the generation of hot combustion gases, the oxidant stream may be preheated.

The hot combustion gas stream flows downstream from zones 10 and 11 into zones 12, 16 and then 18. The direction of the flow of hot combustion gases is shown in the figure by the arrow. Carbon black-yielding feedstock, 30, is introduced at point 32. Carbon black-yielding feedstock, 30, may be simultaneously introduced through probe, 14, at point 34. The distance from the end of the zone of converging diameter, 11, upstream to point 32, is shown as F-1 and the distance from point 32 downstream to point 34 is shown as F-2. To produce the carbon blacks of the present invention, the feedstock may be injected in an amount of from about 85% to about 45%, by weight, at point 32, and the remainder of the total amount of from about 15% to about 55%, by weight, injected at point 34. Preferably from about 80% to about 62% of the total amount of feedstock, by weight, is introduced at point 32, and the remainder of the total amount of feedstock, from about 20% to about 38%, by weight, is introduced at point 34. In the examples described herein carbon black-yielding feedstock, 30, was injected in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon blacks of the present invention.

Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stock and the like.

The mixture of carbon black-yielding feedstock and hot combustion gases flows downstream through zone 12 into zones 16 and 18. Quench 40, located at point 42, injecting quenching fluid 50, is utilized to stop pyrolysis of the carbon black-yielding feedstock. Quench 40, is located at a position 42, and injects quenching fluid 50, generally water, in an amount or at a rate, such that the Toluene Discoloration of the unpelletized and undried carbon blacks produced by the process is between a minimum value which permits the carbon black to be pelleted and about 65%. Q is the distance from the beginning of zone 18 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This is followed by wet pelletization with water and subsequent drying. The drying is carried out at a temperature 510. to increase the Toluene Discloration to a value which permits the carbon black to be commercially useful, for example to a value exceeding 70%. The carbon black reaches a maximum temperature of typically 350°–550° F. in the drying process.

The following testing procedures are used in the determination and evaluation of the analytical properties of the carbon blacks of the present invention, and the physical properties of the rubber compositions incorporating the carbon blacks of the present invention.

CTAB (cetyl-trimethyl ammonium bromide) absorption value of the carbon blacks was determined according to ASTM Test Procedure D3765-85. Iodine adsorption number of the carbon blacks ($I_2$ No.) was determined according to ASTM Test Procedure 510. Tinting strength (Tint) of the carbon blacks was determined according to ASTM Test Procedure D3265-85a. The CDBP (Crushed Dibutyl Phthalate) of the carbon black pellets was determined according to the procedure set forth in ASTM D3493-86. ASTM Aggregate Volume of the carbon black was determined in accordance with ASTM Test Procedure D3849 following dry carbon blacks dispersion procedure A.

The abrasion data of the rubber compositions were determined using an abrader which is based on a Lambourn type machine. Abrasion rates (cubic centimeter/centimeter travel) were measured at 7%, 13% and 21% slip. The slip is based on the relative velocity of the plates rather than angle of slip. In the following examples, the abrasion index is the ratio of the abrasion rate of a control composition containing VULCAN 6 carbon black, a trademarked product of Cabot Corporation, Waltham, Mass. divided by the abrasion rate of a composition produced using a specified carbon black of the present invention, or the VULCAN M or VULCAN K type carbon black at the same slip. The modulus, tensile and elongation of the rubber compositions were measured by the procedure set forth in ASTM D412.

Rebound data were determined on all samples utilizing a ZWICK Rebound Resilience Tester, Model 5109, manufactured by Zwick of America, Inc., Post Office Box 997, East Windsor, Conn. 06088. Instructions for determining the rebound values accompany the instrument.

The effectiveness and advantages of the present invention will be further illustrated by the following examples.

EXAMPLES 1-4

Four examples of the novel carbon blacks of the present invention were prepared in four different carbon black production runs, in a reactor generally described herein, and as depicted in FIG. 1, utilizing the reactor conditions and geometry set forth in Table 2. The fuel utilized in the combustion reaction in each example was natural gas. The liquid feedstock utilized in each example had the properties indicated in the chart below:

TABLE 1

| Feedstock Properties | Ex. 1 | Ex. 2 | Ex. 3 | Ex. 4 |
|---|---|---|---|---|
| Hydrogen/Carbon Ratio | 0.92 | 0.98 | 0.95 | 1.00 |
| Hydrogen (wt. %) | 7.16 | 7.47 | 7.11 | 7.44 |
| Carbon (wt. %) | 92.3 | 91.3 | 88.9 | 88.6 |
| Sulfur (wt. %) | 0.6 | 1.0 | 3.8 | 4.3 |
| A.P.I. Gravity 15.5/15.6 C(60)F [ASTM D-287] | −2.0 | 3.0 | −3.7 | −1.2 |
| Specific Gravity 15.5/15.6 C(60)F [ASTM D-287] | 1.093 | 1.101 | 1.107 | 1.086 |
| Viscosity, SUS (130° F.) [ASTM D-88] | 106.3 | 135.5 | 36.6 | 102.8 |
| Viscosity, SUS (210° F.) [ASTM D-88] | 40.7 | 12.4 | 6.0 | 41.0 |
| BMCI (Visc-Grav) | 135 | 134 | 140 | 132 |

TABLE 2

| | CARBON BLACKS | | | |
|---|---|---|---|---|
| | Ex. 1 | Ex. 2 | Ex. 3 | Ex. 4 |
| D-1, in. | 7.0 | 7.0 | 20.5 | 20.5 |
| D-2, in. | 5.3 | 5.3 | 10.4 | 10.4 |
| D-3, in. | NA | NA | 18.0 | 18.0 |
| D-4, in. | 13.5 | 13.5 | 27.0 | 27.0 |
| L-1, in. | 24.0 | 24.0 | 27.0 | 27.0 |
| L-2, in. | 12.0 | 12.0 | 12.0 | 12.0 |
| L-3, in. | 8.75 | 8.75 | 12.0 | 12.0 |
| L-4, in. | NA | NA | 4.5 | 4.5 |
| F-1, in. | 4.375 | 4.375 | 6.0 | 6.0 |
| F-2, in. | NA | NA | 8 | 14.0 |
| O, in. | 72* | 84 | 72 | 96 |
| Oil Inj. Pt. 32, Tips # × Size, in. | 6 × 0.043 | 6 × 0.047 | 9 × 0.70 | 9 × 0.78 |
| Oil Rate 32, gph | 166 | 189 | 585 | 705 |
| Oil Press. 32, psig | 200 | 110 | 155 | 145 |
| Oil Preheat, 32, °F. | 430 | 415 | 420 | 400 |

TABLE 2-continued

|  | CARBON BLACKS | | | |
|---|---|---|---|---|
|  | Ex. 1 | Ex. 2 | Ex. 3 | Ex. 4 |
| Oil Inj. Pt. 34, Tips # × Size, in. | NA | NA | 3 × 0.70 | 3 × 0.110 |
| Oil Rate 34, gph | NA | NA | 195 | 235 |
| Oil Press. 34, psig | NA | NA | 180 | 50 |
| Oil Preheat, 32, °F. | NA | NA | 420 | 400 |
| C. Air, kscfh | 90 | 100 | 425 | 420 |
| C. Air Preheat °F. | 900 | 900 | 1200 | 1203 |
| Natural Gas, kscfh | 4.89 | 5.27 | 21.0 | 20.8 |
| Air to Burn Ratio | 9.2 | 9.1 | 10.1 | 10.1 |
| Quench Press., psi | 158 | 135 | 215 | 145 |
| Temp. at Quench, °F. | 1350 | 1350 | 1450 | 1538 |

*Quench pointed upstream
Inj. = Injection; C. = combustion; Press. = pressure; 32 = Point 32 on Figure 1; 34 = Point 34 on Figure 1; gph = gallons per hour; psi = pounds/square inch; in. = inches; ft. = feet; °F. = Fahrenheit;
kscfh = standard cubic feet per hour, in thousands
NA = not applicable The carbon blacks produced in each run were then analyzed according to the procedures described herein. The analytical properties of the blacks produced in each run, are listed in Table 3 and were as follows:

TABLE 3

| | Carbon Black | | | | | | |
|---|---|---|---|---|---|---|---|
| | Ex. 1 | Ex. 2 | Ex. 3 | Ex. 4 | VUL. 6 | VUL. M | VUL. K |
| CTAB($m^2$/g) | 92 | 92 | 102 | 85 | 108 | 90 | 75 |
| $I_2$ No.($m^2$/g) | 80 | 86 | 94 | 77 | 121 | 90 | 68 |
| Tint(%) | 110 | 109 | 119 | 107 | 114 | 113 | 101 |
| CDBP (cc/100 g) | 109 | 105 | 105 | 105 | 95 | 96 | 95 |
| $\Delta V$ (nm)$^3$ | 591, 213 | 561, 684 | 521, 117 | 526, 719 | 136, 860 | * | 559, 297 |

VUL. 6 = VULCAN 6 carbon black; VUL. M = VULCAN M carbon black; VUL. K = VULCAN K carbon black. VULCAN 6 carbon black, VULCAN M carbon black and VULCAN K carbon black are trademarked carbon blacks of Cabot Corporation, Waltham, Massachusetts.

EXAMPLE 5

This Example illustrates the use of the novel carbon blacks of the present invention in rubber compositions. Rubber compositions A, B, C, D, E, F and G were prepared incorporating each of the carbon blacks samples according to the rubber formulation procedure shown below in Table 4. Rubber composition A was made with the carbon black of Example 1. Rubber composition B was made with the carbon black of Example 2. Rubber composition C was made with the carbon black of Example 3. Rubber composition D was made with the carbon black of Example 4. Rubber composition E was made with VULCAN 6 carbon black. Rubber composition F was made with VULCAN M carbon black. Rubber composition G was made with VULCAN K carbon black.

TABLE 4

| INGREDIENT | Part by weight |
|---|---|
| SBR 1712 | 89.38 |
| CIS-1,4 BR | 35.00 |
| Carbon Black | 65.00 |
| Oil (Sundex 790) | 10.62 |
| Zinc Oxide | 3.00 |
| Sunproof Improved Stabilizer | 2.50 |
| Wingstay 100 | 2.00 |
| Stearic Acid | 2.00 |
| N-cyclohexyl-2-benzothiazolesulfenamide | 1.50 |
| 2-mercaptobenzothiazole | 0.20 |

TABLE 4-continued

| INGREDIENT | Part by weight |
|---|---|
| Sulfur | 1.75 |

SBR 1712 = an oil extended styrene-butadiene copolymer having a content of 23.5% styrene and 76.5% butadiene
CIS 1,4 BR = a polybutadiene rubber
Sundex 790 = ASTM D2226, Type 101 oil
Sunproof Improved Stabilier = a stabilizer
Wingstay 100 = mixed diaryl p-phenylenediamine The static properties of these rubber compositions were then evaluated according to the ASTM procedures described herein. The results were as follows:

TABLE 5

| Rubber Composition | Modulus 300% El (psi) | Tensile (psi) | $El_b$* (%) |
|---|---|---|---|
| A | 1843 | 2881 | 441 |
| B | 1650 | 2925 | 486 |
| C | 1640 | 2795 | 463 |
| D | 1508 | 2351 | 435 |
| E | 1243 | 2790 | 542 |
| F | 1510 | 2642 | 482 |
| G | 1506 | 2655 | 496 |

*El = elongation; $El_b$ = elongation at break; psi = pounds/square inch

These results show that the 300% Modulus, tensile strength and the elongation at break of the rubber compositions A, B, C and D, produced with the carbon blacks of the present invention, are comparable to those of rubber compositions E, F and G containing conventional carbon blacks.

The Laboratory Abrasion Index of each rubber composition was also evaluated as described herein. Rubber composition E is the control compound for calculating Laboratory Abrasion Index. The results were as follows:

TABLE 6

| Rubber Composition | 7% Slip | 13% Slip | 21% Slip |
|---|---|---|---|
| A | 84 | 104 | 126 |
| B | 85 | 98 | 110 |
| C | 95 | 99 | 106 |
| D | 81 | 90 | 99 |
| E | 100 | 100 | 100 |
| F | 91 | 88 | 91 |
| G | 70 | 64 | 69 |

Figure 2:
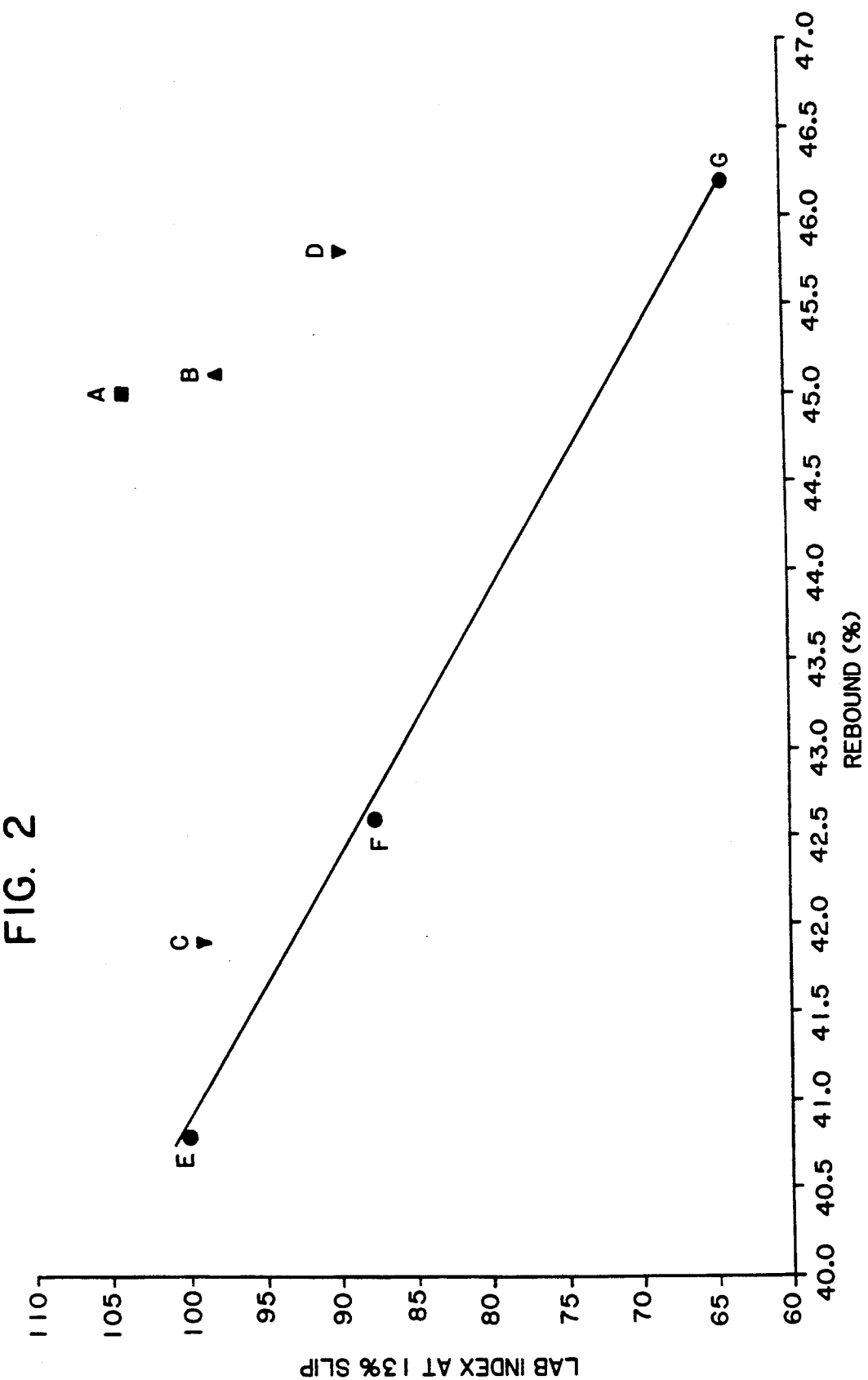
FIG. 2 is a graph of Rebound % versus Laboratory Abrasion Index at 13% Slip for rubber compositions produced with the carbon blacks of the present invention and for rubber compositions produced with reference carbon blacks.
Figure 3:
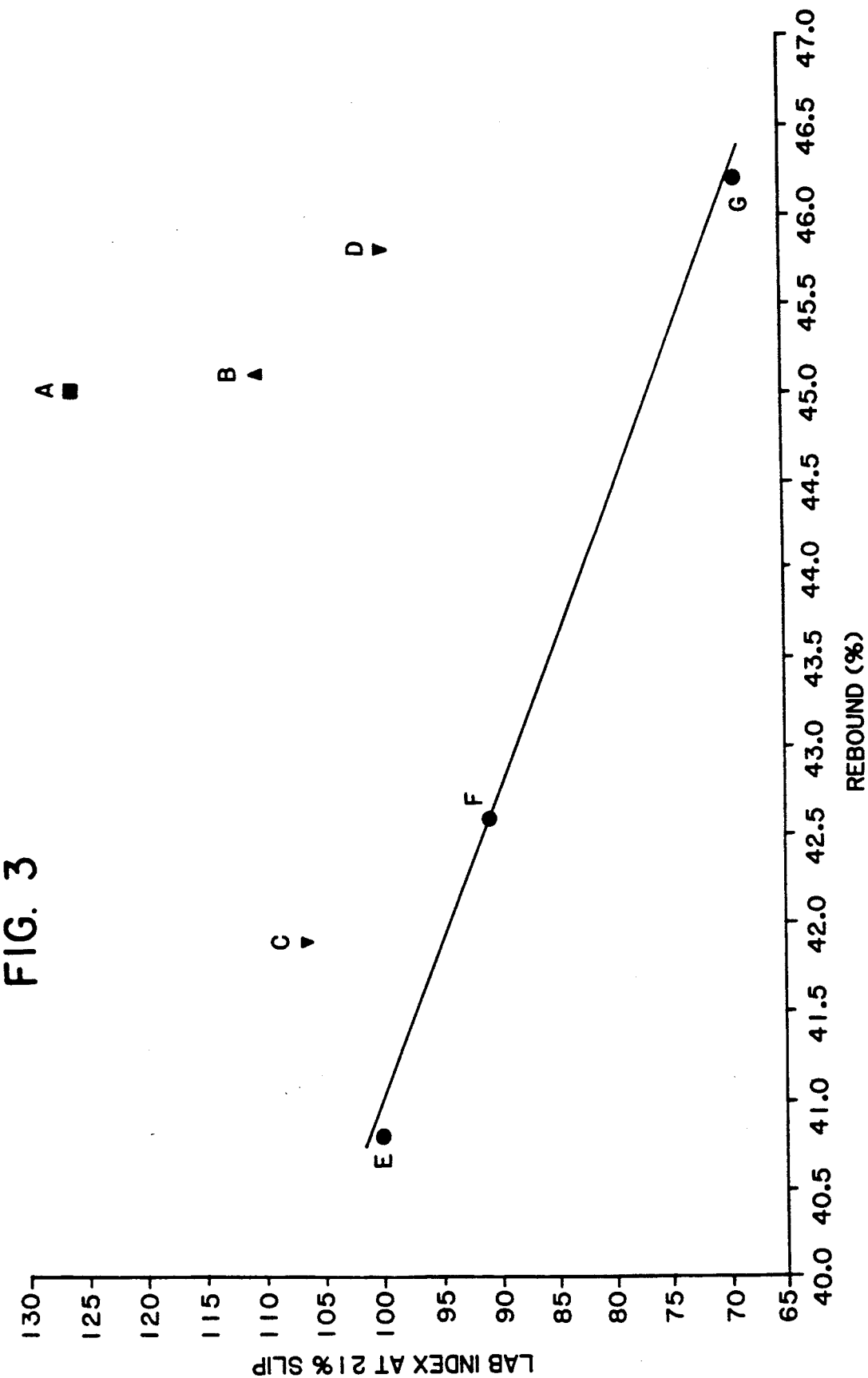
FIG. 3 is a graph of Rebound % versus Laboratory Abrasion Index at 13% Slip for rubber compositions produced with the carbon blacks of the present invention and for rubber compositions produced with reference carbon blacks.

The abrasion/hysteresis performance properties, for the rubber compositions A, B, C and D, containing the carbon blacks of the present invention, and rubber compositions E, F, and G, containing conventional carbon blacks, are shown graphically in FIG. 2 and FIG. 3. FIG. 2 is a plot of abrasion index measured at 13% slip versus rebound and FIG. 3 is a plot of abrasion index measured at 21% slip versus rebound. The results depicted in FIG. 2 and FIG. 3 clearly show that the rubber compositions A, B, C, and D, containing the carbon blacks of the present invention, exhibit significantly better abrasion/hysteresis performance at 13% and 21% slip values, than the rubber compositions containing conventional carbon blacks.

It should be clearly understood that the forms of the present invention herein described are illustrative only and are not intended to limit the scope of the invention. The present invention includes all modifications falling within the scope of the following claims.

We claim:

1. Carbon blacks characterized by having a $CTAB \geq (I_2 No. + 5\ m^2/g)$ wherein $105\ m^2/g \geq CTAB \geq 80\ m^2/g$; a $CDBP \geq 104\ cc/100\ g$; a Tint of $(0.5(CTAB)+70\ m^2/g > Tint > 0.5(CTAB)+60\ m^2/g)$ and an ASTM aggregate volume $\geq 480,000\ (nm)^3$.

2. The carbon black of claim 1 additionally characterized by $120\ cc/100\ g \geq CDBP \geq 104\ cc/100\ g$.

3. The carbon black of claim 1 additionally characterized by $600,000\ (nm)^3 \geq$ ASTM aggregate volume $\geq 500,000\ (nm)^3$.

4. The carbon black of claim 2 additionally characterized by $600,000\ (nm)^3 \geq$ ASTM aggregate volume $\geq 500,000\ (nm)^3$.

5. A rubber composition comprising about 100 parts, by weight, of a rubber and from about 10 to about 250 parts, by weight, of a carbon black having a $CTAB \geq (I_2 No. + 5\ m^2/g)$ wherein $105\ m^2/g \geq CTAB \geq 80\ m^2/g$; a $CDBP \geq 104\ cc/100\ g$; a Tint of $(0.5(CTAB)+70\ m^2/g > Tint > 0.5(CTAB)+60$ and an ASTM aggregate volume $\geq 480,000\ (nm)^3$.

6. The rubber composition of claim 5 wherein the carbon black is additionally characterized by $120\ cc/100\ g \geq CDBP \geq 104$ 7. The rubber composition of claim 5 wherein the carbon black is additionally characterized by $600,000\ (nm)^3 \geq$ ASTM aggregate volume $\geq 500,000\ (nm)^3$.

8. The rubber composition of claim 6 wherein the carbon black is additionally characterized by $600,000\ (nm)^3 \geq$ ASTM aggregate volume $\geq 500,000\ (nm)^3$.

9. The rubber composition of claim 5 wherein the carbon black is present in an amount of from about 20 to about 100 parts by weight per 100 parts by weight rubber.

10. The rubber composition of claim 5 wherein the carbon black is present in an amount of from about 40 to about 80 parts by weight per 100 parts by weight rubber.

* * * * *